US009960908B1

United States Patent
Diamant et al.

(10) Patent No.: US 9,960,908 B1
(45) Date of Patent: May 1, 2018

(54) REDUCED-LATENCY PACKET CIPHERING

(71) Applicant: AMAZON TECHNOLOGIES, INC., Seattle, WA (US)

(72) Inventors: Ron Diamant, Nesher (IL); Nafea Bshara, San Jose, CA (US); Erez Izenberg, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 87 days.

(21) Appl. No.: 14/869,673

(22) Filed: Sep. 29, 2015

Related U.S. Application Data

(60) Provisional application No. 62/182,287, filed on Jun. 19, 2015.

(51) Int. Cl.
  *H04L 9/00* (2006.01)
  *H04L 9/06* (2006.01)
  *H04L 9/08* (2006.01)

(52) U.S. Cl.
  CPC ............ *H04L 9/0637* (2013.01); *H04L 9/065* (2013.01); *H04L 9/0838* (2013.01)

(58) Field of Classification Search
  CPC ..... H04L 9/0637; H04L 9/065; H04L 9/0838; G06F 21/602; G06F 21/72
  USPC ...................... 380/44, 28; 713/189
  See application file for complete search history.

(56) References Cited

U.S. PATENT DOCUMENTS

| | | | | |
|---|---|---|---|---|
| 7,317,795 B2* | 1/2008 | She | ........................ | H04L 9/0618 380/37 |
| 7,900,055 B2* | 3/2011 | Henry | ................. | G06F 9/30003 713/189 |
| 7,925,891 B2* | 4/2011 | Crispin | ................. | H04L 9/0637 713/181 |
| 8,634,550 B2* | 1/2014 | Gueron | ................. | G06F 21/602 380/28 |
| 2011/0255689 A1* | 10/2011 | Bolotov | ................ | H04L 9/0631 380/42 |

OTHER PUBLICATIONS

A. Hodjat, P. Schaumont and I. Verbauwhede, "Architectural design features of a programmable high throughput AES coprocessor," International Conference on Information Technology: Coding and Computing, 2004. Proceedings. ITCC 2004., 2004, pp. 498-502 vol. 2. doi: 10.1109/ITCC.2004.1286703 URL: http://ieeexplore.ieee.org/stamp/stamp.jsp?tp=&arnumber=1.*

* cited by examiner

*Primary Examiner* — Eric W Shepperd
*Assistant Examiner* — Feliciano S Mejia
(74) *Attorney, Agent, or Firm* — Blank Rome LLP

(57) ABSTRACT

A hardware cipher module to cipher a packet. The cipher module includes a key scheduling engine and a ciphering engine. The key scheduling engine is configured to receive a compact key and iteratively generate a set of round keys, including a first round key, based on the compact key and determine, based upon a cipher mode indication and a type of ciphering whether to generate a key-scheduling-done indication after the first round key is generated and before all of the set of round keys are generated or to generate the key-scheduling-done indication after all of the set of round keys is generated. The ciphering engine is configured to begin to cipher the packet with one of the set of round keys as a result of receiving the key schedule done indication.

20 Claims, 6 Drawing Sheets

500

```
┌─────────────────────────────────────────────────────────────────┐
│ Receiving a compact key and beginning to generate a set of      │
│ round keys, including a first round key, based on the compact key│
│                              502                                │
└─────────────────────────────────────────────────────────────────┘
                                │
                                ▼
┌─────────────────────────────────────────────────────────────────┐
│ Beginning to apply the set of round keys to the packet after the│
│ first round key is generated and before all of the set of round │
│ keys is generated if the packet is ciphered with a forward      │
│ cipher algorithm                                                │
│                              504                                │
└─────────────────────────────────────────────────────────────────┘
                                │
                                ▼
┌─────────────────────────────────────────────────────────────────┐
│ Beginning to apply the set of round keys to the packet after all│
│ of the set of round keys is generated if the packet is ciphered │
│ with a backward cipher algorithm                                │
│                              506                                │
└─────────────────────────────────────────────────────────────────┘
```

FIG. 5

REDUCED-LATENCY PACKET CIPHERING

CROSS-REFERENCE TO RELATED APPLICATIONS

This application claims the benefit of U.S. Provisional Patent Application No. 62/182,287 filed Jun. 19, 2015, and titled "Method and Device for Ciphering a Packet," which is incorporated herein by reference in its entirety for all purposes.

BACKGROUND

Block cipher algorithms generally include two paired algorithms; one for encryption and one for decryption. Block ciphers typically receive as input a fixed-length group of bits, or a block, and a key. A cipher mode specifies how an input packet, which may be of a variable length and larger than the fixed-length block required by the block cipher algorithm, is partitioned such that the data may be fed into the cipher algorithm as required. A key schedule algorithm (also referred to as key expansion) receives as input a compact key and generates a set of round keys derived from the compact key. The round keys are then utilized in the cipher algorithm along with the input block of data to be ciphered.

Both the key scheduling and cipher algorithms are iterative processes. For example, expanding a compact key conventionally applies an expansion function to the compact key to generate a first round key, and then applies the expansion function to the first round key to generate a second round key, and so forth, until a set of round keys of a desired size for the particular cipher algorithm is attained. The number of round keys in a set is dependent on the duration of the particular key schedule algorithm.

Similarly, a cipher algorithm conventionally applies a cipher function to an input block or packet using the first round key, and then applies the cipher function on the result of the first algorithm application using the second round key, and so forth, until all round keys in the set have been utilized. As a result of the iterative nature of these processes, the calculation of a set of round keys and subsequent use in a cipher algorithm to cipher a packet is a time consuming process.

Conventionally, hardware-based key schedule implementations (i.e., calculation or generation of the set of round keys from a compact key) are either performed in an "online" or "offline" manner. Online key scheduling leverages a pipelined approach to both the key expansion and the application of the cipher algorithm. In this implementation, each stage of the pipeline contains both hardware to support the application of an expansion function to a previous stage's round key (or compact key in the case of the first stage) and hardware to support the application of a cipher function to a previous stage's result (i.e., both the round key and the result of the application of the cipher function generated by the previous stage). Online key scheduling offers a reduction in latency; however, because each stage of the pipeline requires hardware to apply the key expansion, online key scheduling requires more space to implement.

Offline key scheduling utilizes a single hardware block to perform the iterative key expansion. The round key computed in each iteration may be stored in a memory. The same hardware block is used over and over. Subsequently, once the key expansion is complete (i.e., a set of round keys of a desired size for the particular cipher algorithm is attained), the cipher algorithm is carried out in a pipelined or iterative manner as explained above. Although the size of hardware is reduced by only utilizing one implementation of the key expansion hardware to iteratively generate the set of round keys, latency is greatly increased any time a new compact key is to be utilized (i.e., a key context switch), since the set of round keys must be generated before the cipher algorithm is applied to an input packet.

BRIEF DESCRIPTION OF THE DRAWINGS

The application describes various embodiments of the disclosed technologies with reference to the accompanying drawings, in which:

FIG. 5 illustrates a flow chart of a method for ciphering a packet in accordance with embodiments of the present disclosure.

DETAILED DESCRIPTION

Figure 1A:
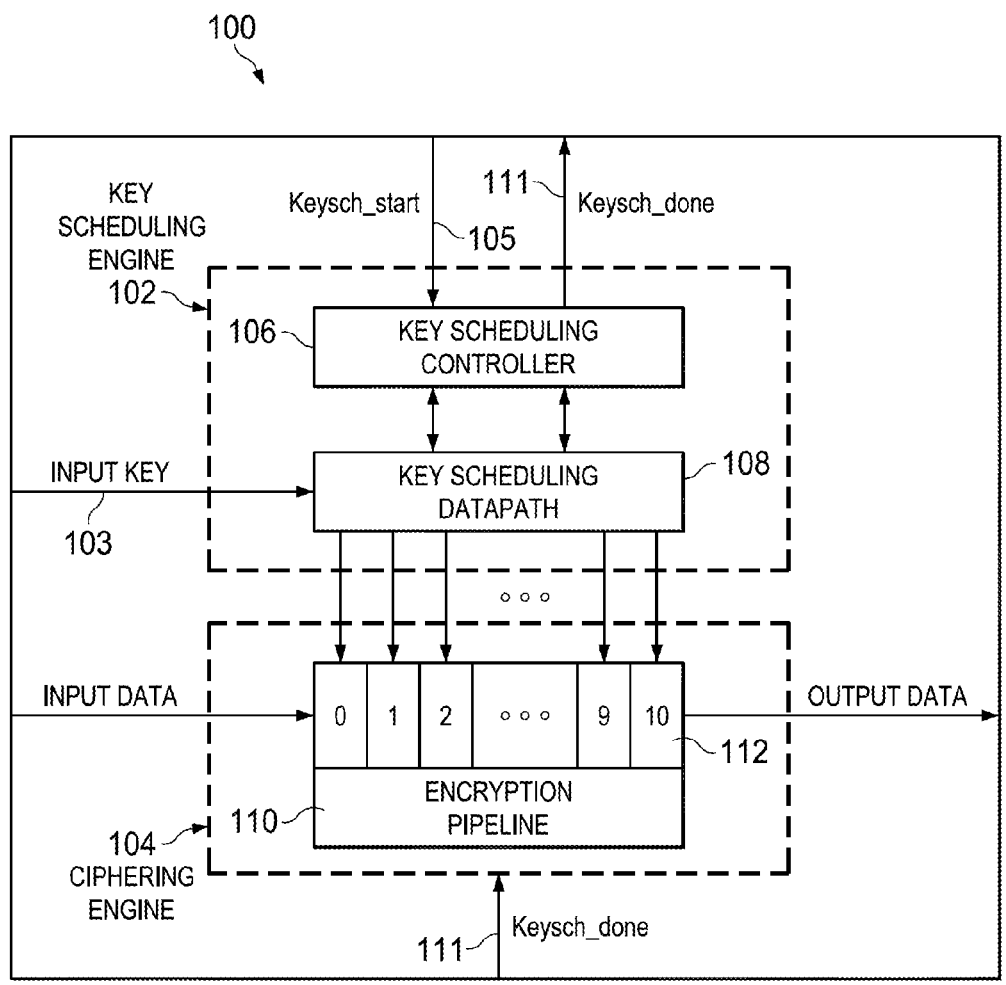
FIGS. 1a and 1b illustrate a hardware cipher module including a key scheduling engine and a ciphering engine in accordance with embodiments of the present disclosure.

As explained above, conventional key scheduling algorithms used to generate a set of round keys for use in a block cipher algorithm require a tradeoff between hardware cost and latency. However, as is often the case, consumer requirements may necessitate improvements in both hardware cost and latency relative to the conventional key scheduling algorithms. Further, conventional key scheduling algorithms generally operate in a cipher mode-agnostic manner, where an upper layer may utilize a particular cipher mode, but the key scheduling and cipher algorithms do not rely on or utilize information pertaining to the particular implemented cipher mode.

Where online key scheduling is utilized, a pipelined approach to both the key expansion and the application of the cipher algorithm results in a reduced latency as both iterative processes (i.e., generating a round key and applying a ciphering algorithm using a round key and input data) are performed at the same time. However, each stage of the pipeline is thus required to implement a key scheduling block, which increases the hardware cost. Offline key scheduling iteratively performs the key expansion prior to application of the cipher algorithm using a single key scheduling block, which reduces the hardware cost relative to online key scheduling. However, the cipher algorithm does not begin to be applied until the key scheduling block has generated a set of round keys.

Input packets to be ciphered may be of a variable length and larger than the fixed-length block required by the block cipher algorithm. To address this, a "cipher mode" specifies how input packets are to be partitioned such that the data may be fed into the cipher algorithm in the required format or length. Various cipher modes exist, and the scope of the present disclosure is not limited to any particular cipher mode or compatibility therewith. However, for purposes of illustration, certain cipher modes referred to herein include counter (CTR) cipher mode, output feedback (OFB) cipher mode, cipher block chaining (CBC) cipher mode, electronic count book (ECB) cipher mode, cipher feedback (CBF) cipher mode, XOR encrypt XOR Tweakable Block Cipher with Ciphertext Stealing (XTS) cipher mode, Galois/counter (GCM) cipher mode, and a counter with CBC-MAC (CCM) cipher mode.

Cipher algorithms include "forward" and "backward" algorithms. A forward algorithm applies the round keys in the order that they are generated by the key schedule algorithm starting with the first round key. A backward algorithm applies the round keys in reverse of the order that they are generated by the key schedule algorithm starting with the last round key, which requires that all of the set of keys be generated prior to beginning to apply the backward cipher algorithm. In the above-mentioned cipher modes (e.g., CTR, OFB, CBC, ECB, CBF, and XTS), encryption uses a forward cipher algorithm. Further, in certain cipher modes (e.g., OFB, GCM, and CTR cipher modes), decryption also uses a forward cipher algorithm. However, certain other cipher modes (e.g., the ECB, XTS, CBC, CCM, and CFB cipher modes) use a backward cipher algorithm for decryption. Encryption and decryption may be referred to herein as "types" of ciphering.

Various embodiments of the present disclosure are directed to a hardware cipher module in which a key scheduling engine or hardware block iteratively generates a set of round keys based on a compact key, similar to the offline key scheduling described above. The cipher module also includes a ciphering engine that applies a cipher algorithm to an input data packet and a round key. However, unlike conventional offline key scheduling, embodiments of the present disclosure utilize a key scheduling engine that generates an indication that the key scheduling is done prior to completing generation of the set of round keys. As will be appreciated in the following description, they key-scheduling-done indication does not indicate that the key scheduling is necessarily done; rather, the key-scheduling-done indication serves to cause the ciphering engine to begin encrypting input data. As such, the ciphering engine receives the indication that key scheduling is done and, as a result, begins to apply the cipher algorithm to the input data packet and a round key, for example as a pipelined process that will be explained in further detail below. In a sense, the ciphering engine receiving the indication that key scheduling is done serves as a trigger for the ciphering engine to begin to apply the cipher algorithm.

Importantly, the key scheduling engine need not be implemented in every stage of the pipeline as in online key scheduling, and thus embodiments of the present disclosure reduce hardware cost relative to online key scheduling. At the same time, latency is reduced relative to offline key scheduling since the disclosed key scheduling engine indicates to the ciphering engine or pipeline that the key scheduling is complete prior to the entire set of round keys actually being generated. In some cases, the key scheduling engine may even generate the key-scheduling-done indication upon generation of a first round key of the set of round keys, such that the ciphering engine begins applying the cipher algorithm to an input data packet in a cycle following generation of the first round key.

Further, in certain embodiments of the present disclosure, an indication of the particular cipher mode, which is conventionally not utilized by a key scheduling engine, may be provided to the cipher module by an upper layer (e.g., in the Open Systems Interconnection (OSI) model). Since cipher modes generally utilize a forward algorithm for encryption of a packet, the ciphering engine can begin to apply the cipher algorithm for encryption once the first round key is generated. Similarly, for cipher modes that utilize a forward algorithm for decryption of a packet, the ciphering engine also can begin to apply the cipher algorithm for decryption once the first round key is generated. Of course, for those cipher modes that utilize a backward algorithm for decryption of a packet, the ciphering engine should wait until the complete set of round keys is generated before beginning to apply the cipher algorithm for decryption, starting with the last round key. The key scheduling engine is provided with an indication of the type of cipher mode, and thus is configured to generate the key-scheduling-done indication in accordance with both whether a packet is to be encrypted or decrypted and the particular cipher mode.

As a result, the hardware cipher module of the present disclosure has a relatively low hardware cost, possibly approximately equal to a conventional offline key schedule implementation, while also offering latency approximately equal to that of a conventional online key schedule implementation. In fact, in embodiments where an upper layer provides a cipher mode indication to the hardware cipher module, the latency may be further reduced where the cipher mode is a type that applies a forward algorithm for decryption.

FIG. 1a illustrates a hardware cipher module 100 in accordance with various embodiments of the present disclosure. In particular, the hardware cipher module 100 includes a key scheduling engine 102 and a ciphering engine 104, both of which are shown as block diagrams for simplicity.

The key scheduling engine 102 receives an input key, which in the first iteration is a compact key, and an indication to begin the key expansion process. In some embodiments, receipt of a new or changed compact key (i.e., a key context switch) may serve as an indication to the key scheduling engine 102 to begin the key expansion process. The key scheduling engine 102 may include various functional blocks, which are shown presently as a key scheduling controller 106 and a key scheduling datapath 108.

The key scheduling datapath 108 carries out the actual expansion of a compact key into one or more round keys, which as explained above is an iterative process. Further, the key scheduling datapath 108 may include a memory unit (not shown for simplicity) in which the round keys are stored for subsequent use by the ciphering engine 104 in applying a cipher algorithm. The actual key expansion performed by the key scheduling datapath 108 depends on the encryption standard being applied, and the scope of the present disclosure is not limited to any particular type of key expansion.

The key scheduling controller 106 controls when the key scheduling datapath 108 begins to perform a key expansion and monitors the state of the expansion process. In accordance with various embodiments, if the ciphering engine 104 is to apply a cipher algorithm for the purposes of encrypting a packet (i.e., a forward algorithm), the key scheduling controller 106 generates an indication 111 that key scheduling is done once at least one round key is generated but before the entire set of round keys is generated. Similarly, if the ciphering engine 104 is to apply a cipher algorithm for the purposes of decrypting a packet and the cipher mode is of a type that uses a forward algorithm for the purposes of decrypting a packet, the key scheduling controller 106 generates an indication 111 that key scheduling is done once at least one round key is generated but before the entire set of round keys is generated.

As a result of receiving the indication 111 that the key scheduling is done, the ciphering engine 104, which includes an encryption pipeline 110, begins to apply a cipher algorithm to an input data packet or block. The application of the cipher algorithm may be carried out by the encryption pipeline 110 which includes pipeline stages 112. Since the key scheduling controller 106 generates the indication 111 after, in some embodiments, the first round key is generated, the first round key is available for the first encryption pipeline stage 112, and thus latency is reduced. However, the key scheduling engine 102 is not itself implemented in each pipeline stage 112, which reduces hardware cost as well.

Figure 1B:
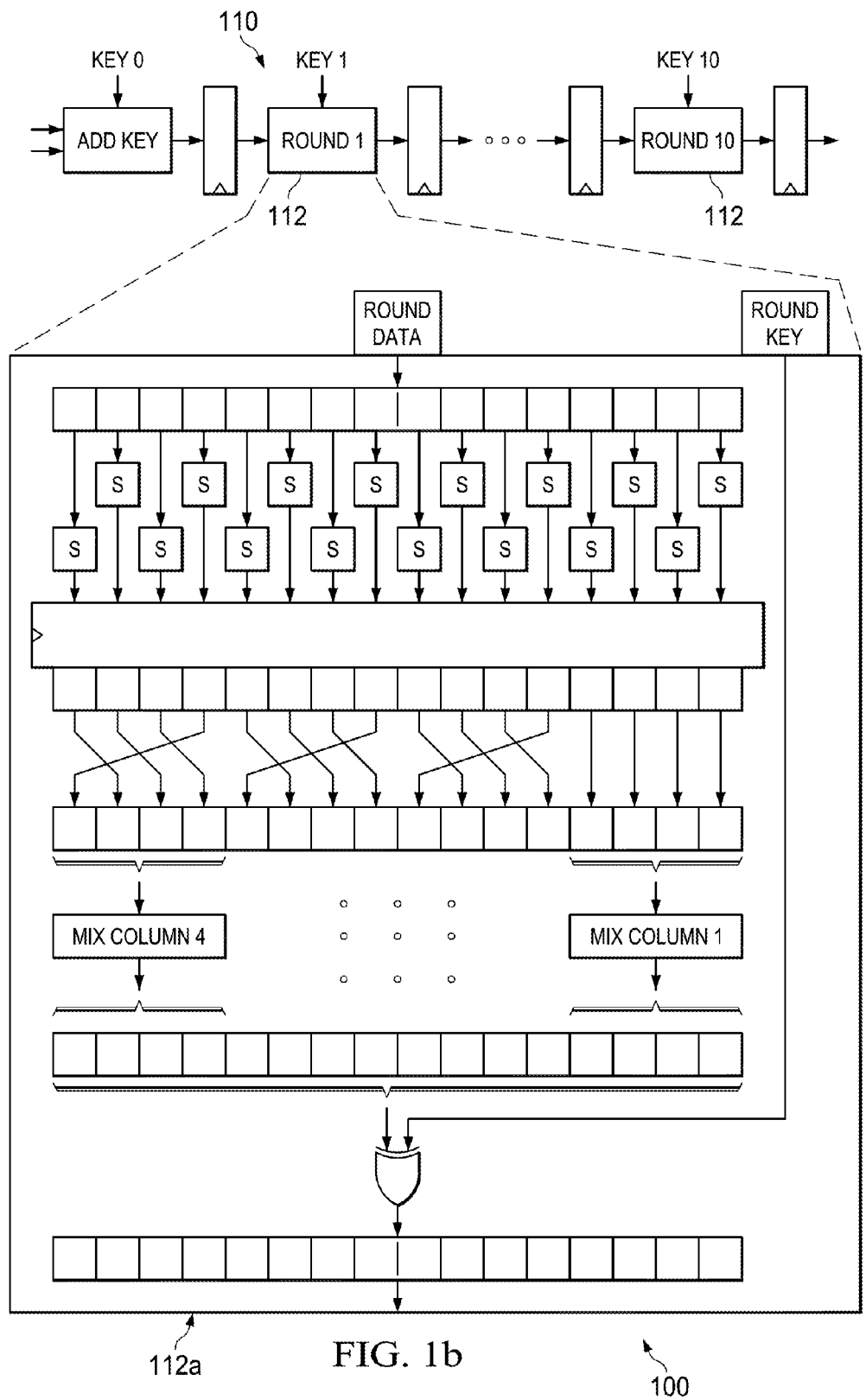

FIG. 1b illustrates the encryption pipeline 110 in further detail. As can be seen, each round key (e.g., Key 0, Key 1, Key 2, etc.) is made available to its associated pipeline stage 112, although the key scheduling engine 102 is not pipelined along with the ciphering engine 104. Each pipeline stage 112 receives as input round data. The round data input into the first pipeline stage 112 (i.e., stage 0 of the pipeline 110) is simply the input packet or block itself. The round data input to each subsequent stage is the previous stage's output. Each pipeline stage 112 then applies the cipher algorithm, an example implementation of which is shown in the expanded view 112a, to the round data and the round key corresponding to that particular stage 112. The exemplary expanded stage 112a stores the round data input for that particular stage in a latch and applies one or more scrambling functions to the round data before performing an exclusive or (XOR) operation on the scrambled round data and the round key for that particular stage. As noted above, the output of the expanded stage 112 will be provided to a subsequent stage 112 as round data. The output of the final stage 112 is the encrypted (or decrypted) packet.

Figure 2:
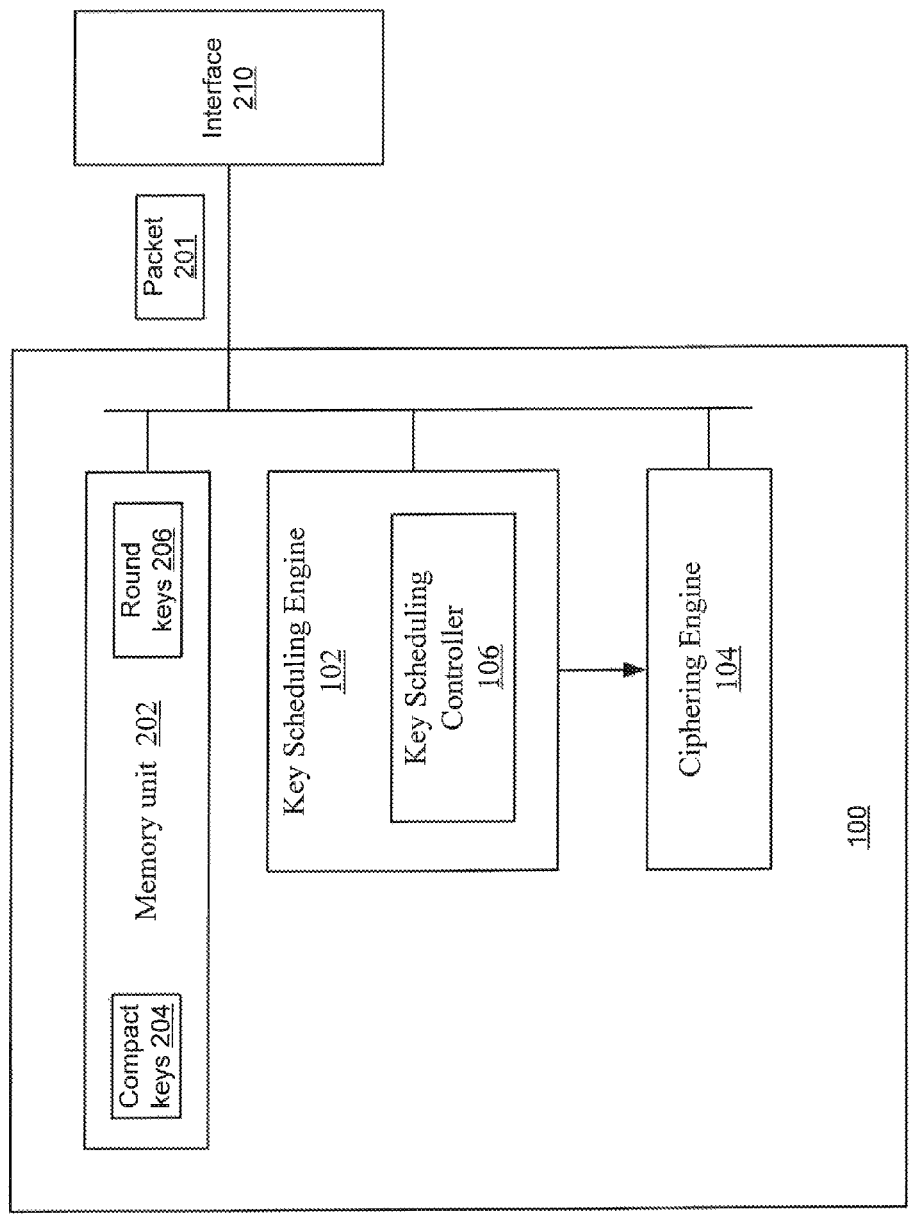
FIG. 2 illustrates a device that includes a hardware cipher module in accordance with embodiments of the present disclosure.

FIG. 2 illustrates a device 200 that includes the hardware cipher module 100 explained above in accordance with various embodiments of the present disclosure. The device 200 may be a computer, a part of a computer, a communication device, a part of a communication device, and the like. As above, the hardware cipher module 100 has at least one hardware component. FIG. 2 illustrates the hardware cipher module 100 as including the key scheduling engine 102 comprising the key scheduling controller 106, a memory unit 202, and the ciphering engine 104, which were described above with respect to FIGS. 1a and 1b.

The hardware cipher module 100 is coupled to an interface 210. The interface 210 interfaces between the hardware cipher module 100 and other circuits or modules such as other computers, buses, or processors. For example, the module 100 may be implemented as part of a system-on-chip (SoC), an application-specific integrated circuit (ASIC), or other type of processor.

In some embodiments the key scheduling controller 106 is configured to receive a request for ciphering a packet 201 (e.g., from the interface 210) and to control the ciphering of the packet, as explained above. The packet 201 may include plain text and the ciphering may include encrypting the packet. The packet 201 may include encrypted content and the ciphering may include decrypting the packet or performing another encryption of the packet. The packet 201 may include multiple blocks that are ciphered by applying a cipher algorithm. The packet is ciphered according to a cipher mode; an indication of the cipher mode may be provided to the key scheduling controller 106 by an upper layer (e.g., via the interface 210). The hardware cipher module 100 is not limited to ciphering any particular type of packet 201, nor is it limited to application of a particular cipher algorithm or use of a particular cipher mode.

As above, the hardware cipher module 100 may be configured to begin applying a cipher algorithm to a packet 201 before the entire set of round keys is calculated when a forward cipher algorithm is being applied on the packet. This reduces the duration of ciphering relative to conventional offline key scheduling and avoids the hardware cost of online key scheduling, as the key scheduling controller 106 is not implemented in each pipeline stage of the ciphering engine 104. Further, the penalty typically associated with key context switching (i.e., when the compact key to be used changes) is greatly reduced. Conventionally, for example, when a compact key changes, an offline key scheduling algorithm would need to regenerate the entire set of round keys before the round keys could be utilized for ciphering a packet. However, embodiments of the present disclosure allow the ciphering process to begin prior to the entire set of round keys being generated from the new compact key, which results in a reduction in latency upon a key context switch or switching to a new compact key.

The ciphering engine 104 is configured to apply the set of round keys 206 (which may be accessed in the memory unit 202, provided directly by the key scheduling engine 102 or controller 106, or accessed in a different memory unit, not shown) on the packet 201. When encrypting a packet 201, the first round key is applied on the packet, or a portion of the packet, while further round keys are applied on the outcomes of subsequent iterations of the encryption process.

The key scheduling engine 102 is configured to generate an indication that the key scheduling is done after calculating the first round key and before all the set of round keys are calculated when the ciphering of the packet involves applying a forward cipher algorithm. As a result, the ciphering engine 104 begins to apply the first round key of the set of round keys on the packet 201 after the key scheduling engine 102 calculates the first round key and before the key scheduling engine 102 calculates the full set of round keys.

In cases where the ciphering of the packet involves applying a backward cipher algorithm, the key scheduling engine 102 is configured to generate an indication that the key scheduling is done only after the key scheduling engine 102 calculates the full set of round keys. As a result, in this case, the entire set of round keys is assured to be calculated before the ciphering engine 104 begins to apply the last round key on the packet 201.

In situations where a forward cipher algorithm is applied and/or when encrypting and/or when the cipher mode is OFB, CTR, or GCM, the key scheduling controller 106 may be configured to generate the key-scheduling-done indication such that the ciphering engine 104 begins to apply the first round key on the packet after the key scheduling engine 102 calculates the first round key and before the key scheduling engine 102 calculates a second round key of the set of round keys.

In some cases, the duration required to calculate the first round key may be one cycle long and the ciphering engine 104 may be configured to begin to apply the first round key on the packet one cycle after the key calculation circuit started to calculate the first round key.

In some cases the hardware cipher module 100 is compact in terms of hardware or chip area, since they key scheduling engine 102 hardware is not repeated in each stage of the pipeline, as would be the case when employing online key scheduling. The hardware cipher module 100 thus achieves an online-key-schedule latency performance, while requiring a hardware area similar to an offline-key-schedule implementation.

In certain embodiments, the hardware cipher module 100 may store compact keys 204 and the sets of calculated round keys 206 in the memory unit 202 for future use. However, in certain other embodiments the compact keys 204 and round keys 206 may be stored in separate memory units or locations within a memory unit. In the case where the same round keys should be applied on all packets that belong to a communication session between the device 200 and another device, then after the hardware cipher module 100 finishes calculating the entire set of round keys of a packet of a certain session, these round keys may be stored in the memory unit 202 and used for ciphering other packets of the session. Further, round keys 206 may be deleted when a session ends or when they are of no further use. Additionally or alternatively, the round keys 206 may be deleted even if they may be used in the future (e.g., due to memory size limitations).

Figure 3:
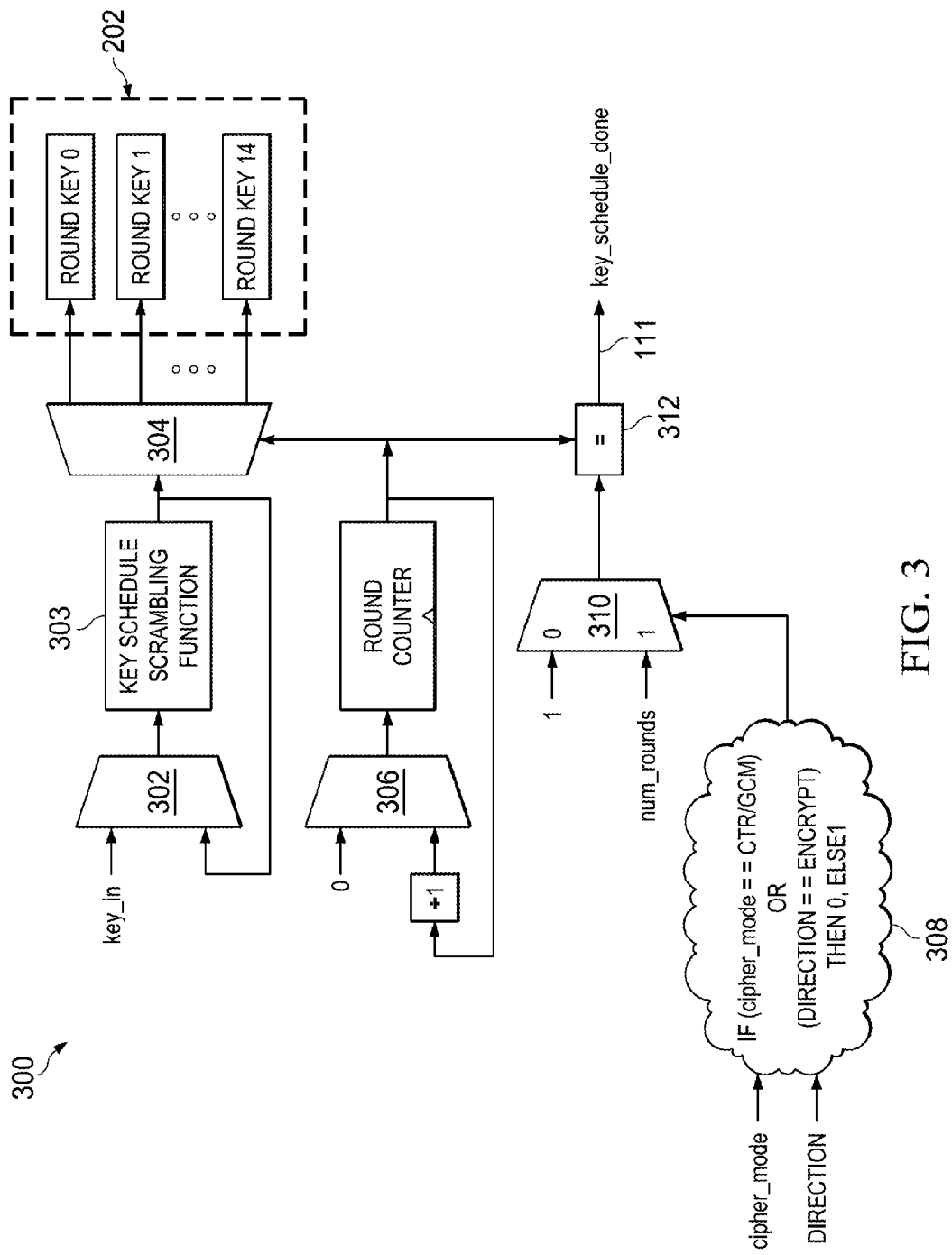
FIG. 3 illustrates an exemplary implementation of a key scheduling engine in accordance with embodiments of the present disclosure.

FIG. 3 shows an example implementation 300 of the key scheduling engine 102. A compact key labeled "key in" is provided to multiplexer 302 and initially this input is selected to begin the key expansion process. The key schedule scrambling function 303 produces a first round key based on the output of multiplexer 302, which is the compact key in the first iteration, and is the previously produced round key in subsequent iterations. A de-multiplexer 304 writes the round key generated by the scrambling function 303 to memory unit 202 at a location determined by the round count, which is kept and updated by counter circuit 306.

In accordance with various embodiments, the key scheduling engine 300 includes logic 308 to determine whether to generate the key-scheduling-done indication 111 prior to completing the calculation of the entire set of round keys. In the depicted embodiment, the inputs for the logic 308 are the cipher mode and the direction of the encryption operation (e.g., encrypt or decrypt). As explained above, in situations where the ciphering type is encryption or the cipher mode is one in which both encryption and decryption are performed with a forward algorithm (e.g., CTR, GCM, and OFB), the logic 308 will cause the multiplexer 310 to output a value of less than the total number of rounds. In the example of FIG. 3, the multiplexer 310 outputs a value of '1' as shown, where the total number of rounds is 15. Thus, when the round count value from the counter circuit 306 is equal to 1, the comparator 312 outputs an asserted signal, which is an indication 111 that the key scheduling is done. Of course, as explained above, the key expansion continues; however, the ciphering engine receives the indication 111 and thus begins to apply the ciphering algorithm earlier than would conventionally occur.

In situations where the ciphering type is decryption and the cipher mode is one in which decryption is performed with a backward algorithm (e.g., CBC, ECB, CBF, CCM, and XTS), the logic 308 will cause the multiplexer 310 to output the total number of rounds (in this case 15, as indicated by the number of round keys stored in the memory unit 202). As a result, only when the round count is equal to the total number of rounds—that is, when the complete set of round keys has been calculated—does the comparator 312 output an asserted signal which is an indication 111 that the key scheduling is done. In this way, the key scheduling engine 102 ensures that where a backward algorithm is to be applied, all round keys are generated prior to beginning ciphering, which begins with the last round key.

Figure 4:
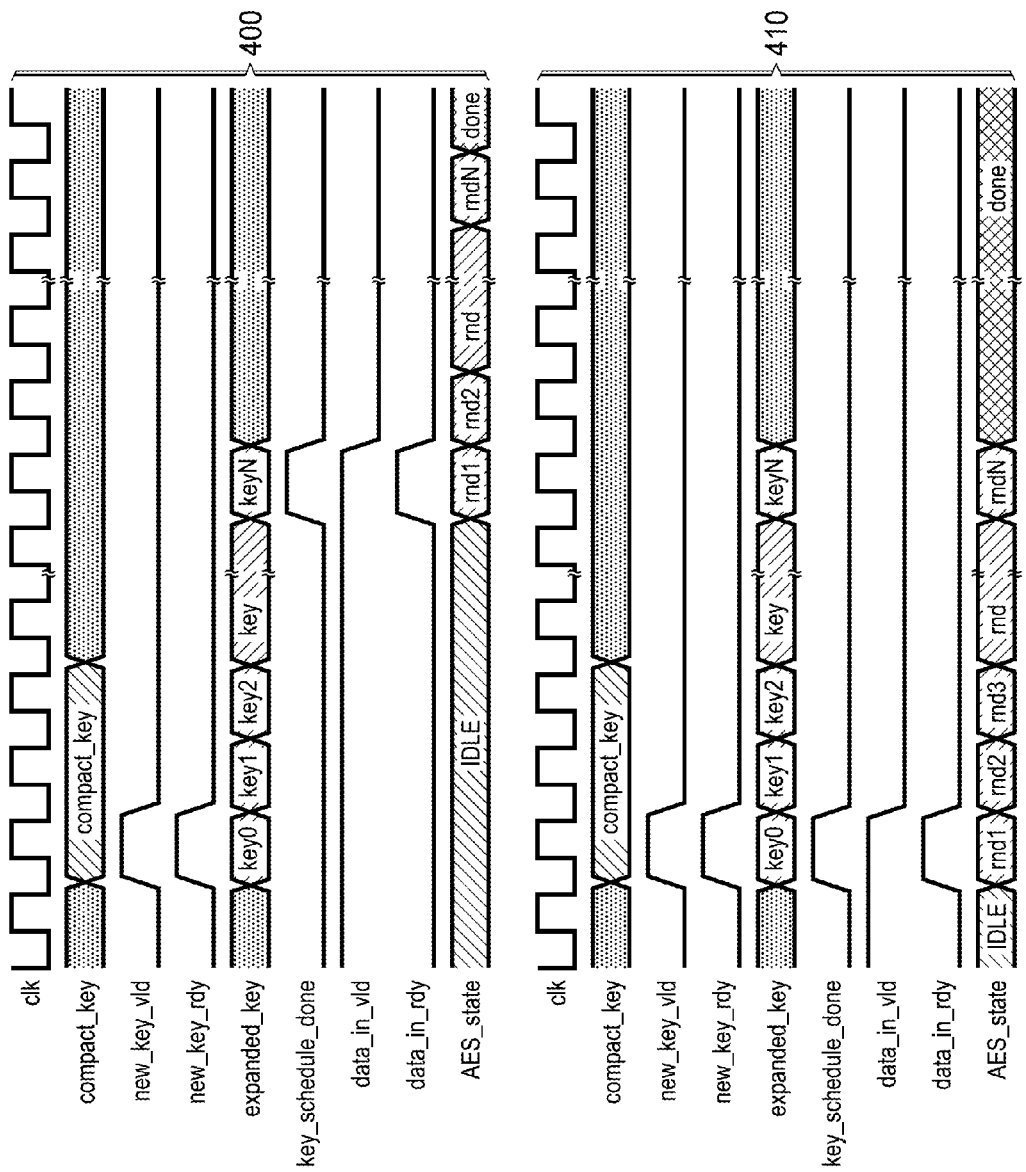
FIG. 4 is a timing diagram showing an improvement in latency afforded by embodiments of the present disclosure.

FIG. 4 shows a conventional offline timing waveform 400 in conjunction with a timing waveform 410 that corresponds to embodiments of the present disclosure. As can be seen, in waveform 410, the key schedule done signal is asserted upon calculation of the first round key ("key0"). As a result, the ciphering algorithm begins to be applied ("rnd1") prior to all round keys being calculated. By contrast, the conventional waveform 400 demonstrates that an additional N−1 (where N is the number of rounds) cycles of latency are introduced, since conventional offline hardware expansion only begins to apply the ciphering algorithm once all round keys are calculated. Of course, in other embodiments the key scheduling engine 102 may assert the key schedule done signal at some time after the first round key is calculated but before the complete set of round keys is calculated, for example for timing purposes. Other signals in the waveforms 400, 410 correspond to an indication that the new compact key can be loaded into the key scheduling engine 102; for example, key_in_vld indicates that a previous hardware block is ready to load a new key, while key_in_rdy indicates that the key scheduling engine 102 is ready to receive a new key (thus, key expansion can begin). Similarly, the data_in_vld indicates that a previous hardware block is ready to load a new block to the ciphering engine 104 (e.g., an AES engine), while data_in_rdy indicates that the ciphering engine 104 is ready to receive a new block for encryption. In certain embodiments, data_in_rdy cannot be asserted until a key-scheduling-done indication is received.

FIG. 5 illustrates a flow chart of a method 500 in accordance with various embodiments of the present disclosure. The method 500 begins in block 502 with receiving a compact key and iteratively generating a set of round keys, which includes a first round key, based on the compact key. Generating the set of round keys may be referred to as a key expansion process. In some embodiments, receipt of a new or changed compact key (i.e., a key context switch) may serve as an indication to begin the key expansion process. Key context switches may occur in an application-specific manner, where certain applications requiring greater security for their communication sessions perform context switches more frequently (e.g., to avoid deterministic identification of a long-term compact key through packet sniffing and the like). In applications where security is of the utmost importance and thus context switches are performed frequently, the hardware penalty associated with conventional online key scheduling (providing reduced latency for a context switch) is an acceptable tradeoff. Similarly, in applications where security is less important and thus context switches are performed infrequently, the latency penalty associated with conventional offline key scheduling is an acceptable tradeoff for the reduced hardware requirements associated with conventional offline key scheduling. However, as explained above, embodiments of the present allow for reduced latency upon a key context switch while also avoiding the hardware penalty associated with conventional online key scheduling.

The actual expansion of a compact key into one or more round keys is an iterative process. Further, the round keys may be stored in a memory unit for subsequent use in applying a cipher algorithm. The actual key expansion depends on the encryption standard being applied, and the scope of the present disclosure is not limited to any particular type of key expansion.

The method 500 continues in block 504 with beginning to apply the set of round keys to the packet that is being ciphered after the first round key is generated and before all of the set of round keys is generated if the packet is ciphered with a forward cipher algorithm. That is, if the ciphering engine explained above is to apply a cipher algorithm for the purposes of encrypting a packet (i.e., a forward algorithm), the ciphering algorithm including application of round keys to the packet may begin once at least one round key is generated but before the entire set of round keys is generated, which reduces the latency of the implemented ciphering method. Similarly, when applying a cipher algorithm for the purposes of decrypting a packet where the cipher mode is of a type that uses a forward algorithm for the purposes of decrypting a packet, the ciphering algorithm including application of round keys to the packet may begin once at least one round key is generated but before the entire set of round keys is generated.

The method 500 continues in block 506 with beginning to apply the set of round keys to the packet after all of the set of round keys is generated if the packet is ciphered with a backward cipher algorithm. In particular, in cases where the ciphering of the packet involves applying a backward cipher algorithm, the ciphering algorithm (including application of round keys to the packet) may begin only once the complete set of round keys is calculated, since the backward algorithm utilizes the last round key first.

Similar to the above-described hardware cipher module 100, the method 500 leverages the fact that the key scheduling or expansion process need not be carried out in a pipelined fashion as in online key scheduling, which reduces complexity compared to an online key scheduling process. At the same time, the method 500 reduces latency relative to offline key scheduling, since the ciphering of the packet begins prior to the entire set of round keys actually being generated.

Further, in certain embodiments of the present disclosure, the method 500 may include receiving an indication of a cipher mode and determining whether the packet is ciphered with a forward or backward cipher algorithm based on the cipher mode and whether the packet is to be encrypted or decrypted.

Conventionally, an indication of the particular cipher mode from an upper layer is not utilized in applying a ciphering algorithm. Since cipher modes generally utilize a forward algorithm for encryption of a packet, the method can begin to apply the cipher algorithm for encryption once the first round key is generated. Similarly, for cipher modes that utilize a forward algorithm for decryption of a packet, the method also can begin to apply the cipher algorithm for decryption once the first round key is generated. Of course, for those cipher modes that utilize a backward algorithm for decryption of a packet, the method waits until the complete set of round keys is generated before beginning to apply the cipher algorithm for decryption, starting with the last round key.

As a result, the described method can be carried out with a hardware cost approximately equal to conventional offline key schedule methods while offering latency approximately equal to conventional online key schedule methods. In fact, in embodiments where an upper layer indication of cipher mode is leveraged, the latency may be further reduced where the cipher mode is a type that applies a forward algorithm for decryption, since in these cases ciphering may begin regardless of direction (i.e., for both encryption and decryption) prior to the full set of round keys being generated.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing detailed description, numerous specific details are set forth in order to provide a thorough understanding of the disclosed technologies. However, it will be understood by those skilled in the art that some embodiments may be practiced without these specific details. In other instances, well-known methods, procedures, and components have not been described in detail so as not to obscure the disclosure. Numerous variations and modifications will become apparent to those skilled in the art once the above disclosure is fully appreciated. It is intended that the following claims be interpreted to embrace all such variations and modifications.

What is claimed is:

1. A hardware cipher module to cipher a packet, comprising:
   a key scheduling engine comprising circuitry configured to:
   receive a compact key and begin to generate a set of round keys, including a first round key, based on the compact key;
   determine which of a forward algorithm and a backward algorithm is indicated by a cipher mode indication and which of encryption and decryption is indicated by a type of ciphering,
   in a case that the cipher mode indication indicates a forward algorithm, generate a key-scheduling-done indication after the first round key is generated and before all of the set of round keys is generated; and
   in a case that the cipher mode indication indicates a backward algorithm, generate the key-scheduling-done indication after all of the set of round keys is generated; and
   a ciphering engine comprising circuitry configured to begin to cipher the packet with one of the set of round keys as a result of receiving the key schedule done indication.

2. The hardware cipher module according to claim 1 wherein the key scheduling engine is configured to determine to generate a key-scheduling-done indication after the first round key is generated and before all of the set of round keys are generated when the type of ciphering is encryption.

3. The hardware cipher module according to claim 1 wherein the key scheduling engine is configured to determine to generate a key-scheduling-done indication after the first round key is generated and before all of the set of round keys are generated when the type of ciphering is decryption and the cipher mode is a Galois/counter (GCM) cipher mode, a counter (CTR) cipher mode, or an output feedback (OFB) cipher mode.

4. The hardware cipher module according to claim 1 wherein the controller is configured to determine to generate the key-scheduling-done indication after all of the set of round keys is generated when the type of ciphering is decryption and the cipher mode is one of:
   a cipher block chaining (CBC) cipher mode;
   an electronic code book (ECB) cipher mode;
   a cipher feedback (CBF) cipher mode;
   a counter with CBC-MAC (CCM) cipher mode; or
   a XOR encrypt XOR Tweakable Block Cipher with Ciphertext Stealing (XTS) cipher mode.

5. A hardware cipher module to cipher a packet, comprising:
   a key scheduling engine comprising circuitry configured to:
   receive a compact key and generate a first portion of a set of round keys, the portion including a first round key, based on the compact key;
   determine which of a forward cipher algorithm and a backward cipher algorithm is indicated by an indication of a cipher mode to be applied to the packet, and base on the indication of the cipher mode whether to generate a key-scheduling-done indication prior to completion of calculation of an entire set of round keys;
generate a key-scheduling-done indication after the first round key is generated and before a last round key of the set of round keys is generated, wherein the generating the key-scheduling-done indication is based on the indication of the cipher mode signifying that a forward cipher algorithm is to be applied to the packet; and
generate a remaining portion of the set of round keys, including the last round key; and
a ciphering engine comprising circuitry configured to begin to cipher the packet with one of the set of round keys as a result of receiving the key schedule done indication.

6. The hardware cipher module of claim 5 wherein the key scheduling engine is further configured to determine that a backward cipher algorithm is to be applied to the packet and, as a result, generate the key-scheduling-done indication after all of the set of round keys is generated.

7. The hardware cipher module of claim 5 wherein the key scheduling engine is configured to receive the indication of a cipher mode and determine whether the packet is ciphered with a forward or backward cipher algorithm based on the cipher mode and whether the packet is to be encrypted or decrypted.

8. The hardware cipher module of claim 5 wherein the key scheduling engine is configured to:
generate the first round key in a duration of one cycle; and
generate the key-scheduling-done indication in a cycle immediately succeeding the cycle in which the first round key is generated if the packet is ciphered with a forward cipher algorithm.

9. The hardware cipher module of claim 5 wherein the key scheduling engine is configured to:
generate each of the set of round keys in respective one-cycle durations; and
generate the key-scheduling-done indication in one of the cycles preceding the cycle in which a last key of the set of round keys is generated if the packet is ciphered with a forward cipher algorithm.

10. The hardware cipher module of claim 5 further comprising a memory unit configured to store the set of round keys, wherein the ciphering engine is configured to:
receive a second packet to be encrypted using the set of round keys; and
apply the set of round keys stored in the memory unit prior to receiving the key-scheduling-done indication from the key scheduling engine.

11. The hardware cipher module according to claim 10 wherein the packet and the second packet belong to a same communication session.

12. The hardware cipher module according to claim 10 wherein the memory unit is configured to store the compact key and the key scheduling engine is configured to retrieve the compact key from the memory unit.

13. The hardware cipher module according to claim 5 wherein, as a result of the hardware cipher module receiving another packet that should not be encrypted using the set of round keys, the key scheduling engine is configured to perform a key context switch.

14. The hardware cipher module according to claim 5 wherein the hardware cipher module is integrated into a system-on-chip (SoC), a processor, or an application-specific integrated circuit (ASIC).

15. The hardware cipher module according to claim 5 wherein the ciphering engine is implemented as a pipeline comprising a plurality of stages including a first stage and subsequent stages, the first stage configured to:
receive the packet and the first round key;
apply a ciphering algorithm to the packet and the first round key; and
generate an output based on the application of the ciphering algorithm; and each subsequent stage configured to:
receive the output of an immediately preceding stage and one of the set of round keys;
apply the ciphering algorithm to the preceding stage output and the one of the set of round keys; and
generate an output based on the application of the ciphering algorithm;
wherein the key scheduling engine is not implemented in at least some of the pipeline stages.

16. A method for ciphering a packet, comprising:
receiving, by a cipher circuit, compact key and beginning to generate a set of round keys, including a first round key, based on the compact key;
receiving, by the cipher circuit, an indication of a cipher mode to be applied to the packet,
determining, by the cipher circuit, which of a forward cipher algorithm and a backward cipher algorithm is indicated by the indication of the cipher mode, and based on the indication of the cipher mode whether to begin to cipher the packet before all of a set of round keys is generated;
in a case in which determining the finds that the packet is to be ciphered with a forward cipher algorithm, beginning, by a cipher circuit, to cipher the packet with one of the set of round keys after the first round key is generated and before all of the set of round keys is generated; and
in a case in which the determining finds that the packet is to be ciphered with a backward cipher algorithm, beginning, by a cipher circuit, to cipher the packet with one of the set of round keys after all of the set of round keys is generated.

17. The method of claim 16 further comprising:
determining whether the packet is ciphered with a forward or backward cipher algorithm based on the cipher mode and whether the packet is to be encrypted or decrypted.

18. The method of claim 16 further comprising:
generating the first round key in a duration of one cycle;
beginning to cipher the packet in a cycle immediately succeeding the cycle in which the first round key is generated if the packet is ciphered with a forward cipher algorithm.

19. The method of claim 16 further comprising:
storing the set of round keys in a memory unit;
receiving a second packet to be encrypted using the set of round keys; and
applying the set of round keys stored in the memory unit.

20. The method according to claim 16 further comprising performing a key context switch as a result of receiving another packet that should not be encrypted using the set of round keys.

* * * * *